US007877639B2

(12) United States Patent
Hoang et al.

(10) Patent No.: US 7,877,639 B2
(45) Date of Patent: Jan. 25, 2011

(54) SYSTEMS AND METHODS TO PROVIDE FAILOVER SUPPORT FOR BOOTING EMBEDDED HYPERVISOR FROM AN INTERNAL NON-VOLATILE MEMORY CARD

(75) Inventors: Quy Hoang, Round Rock, TX (US); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 274 days.

(21) Appl. No.: 12/266,107

(22) Filed: Nov. 6, 2008

(65) Prior Publication Data

US 2010/0115257 A1 May 6, 2010

(51) Int. Cl.
G06F 11/00 (2006.01)
(52) U.S. Cl. .................. 714/36; 713/1; 714/13; 718/1
(58) Field of Classification Search .................. 713/1; 714/13; 718/1
See application file for complete search history.

(56) References Cited

U.S. PATENT DOCUMENTS

| | | | | |
|---|---|---|---|---|
| 7,487,343 | B1 * | 2/2009 | Insley et al. | 713/1 |
| 2006/0136708 | A1 * | 6/2006 | Hajji et al. | 713/2 |
| 2007/0011272 | A1 * | 1/2007 | Bakke et al. | 709/217 |
| 2007/0243925 | A1 * | 10/2007 | LeMay et al. | 463/20 |
| 2007/0243934 | A1 * | 10/2007 | Little et al. | 463/40 |
| 2008/0109804 | A1 * | 5/2008 | Bloomstein et al. | 718/1 |
| 2008/0126854 | A1 * | 5/2008 | Anderson et al. | 714/13 |
| 2009/0265708 | A1 * | 10/2009 | Nakajima | 718/1 |
| 2010/0058335 | A1 * | 3/2010 | Weber | 718/1 |

OTHER PUBLICATIONS

Patent Application under Client Docket No. DC-12225, "System and Method of Recovering from Failures in a Virtual Machine", Vasudevan et al., 32 pages, Nov. 3, 2006.

* cited by examiner

Primary Examiner—Robert Beausoliel
Assistant Examiner—Jeison C Arcos
(74) Attorney, Agent, or Firm—Baker Botts L.L.P.

(57) ABSTRACT

The present disclosure further relates to information handling systems with failover support for booting an embedded hypervisor, the information handling system. For example, an information handling system with failover support may comprise a processor; one or more applications configured to be executed, at least in part, by the processor; a memory communicatively coupled to the processor and comprising a basic input/output system (BIOS), the BIOS comprising a BIOS universal serial bus (USB) driver, the BIOS USB driver comprising a mass storage device driver; a primary internal embedded hypervisor non-volatile memory (NVM) card communicatively coupled to the memory, the first NVM card comprising a first bootable hypervisor image; and a back up internal embedded hypervisor NVM card communicatively coupled to the memory, the second NVM card comprising a second bootable hypervisor image.

20 Claims, 3 Drawing Sheets

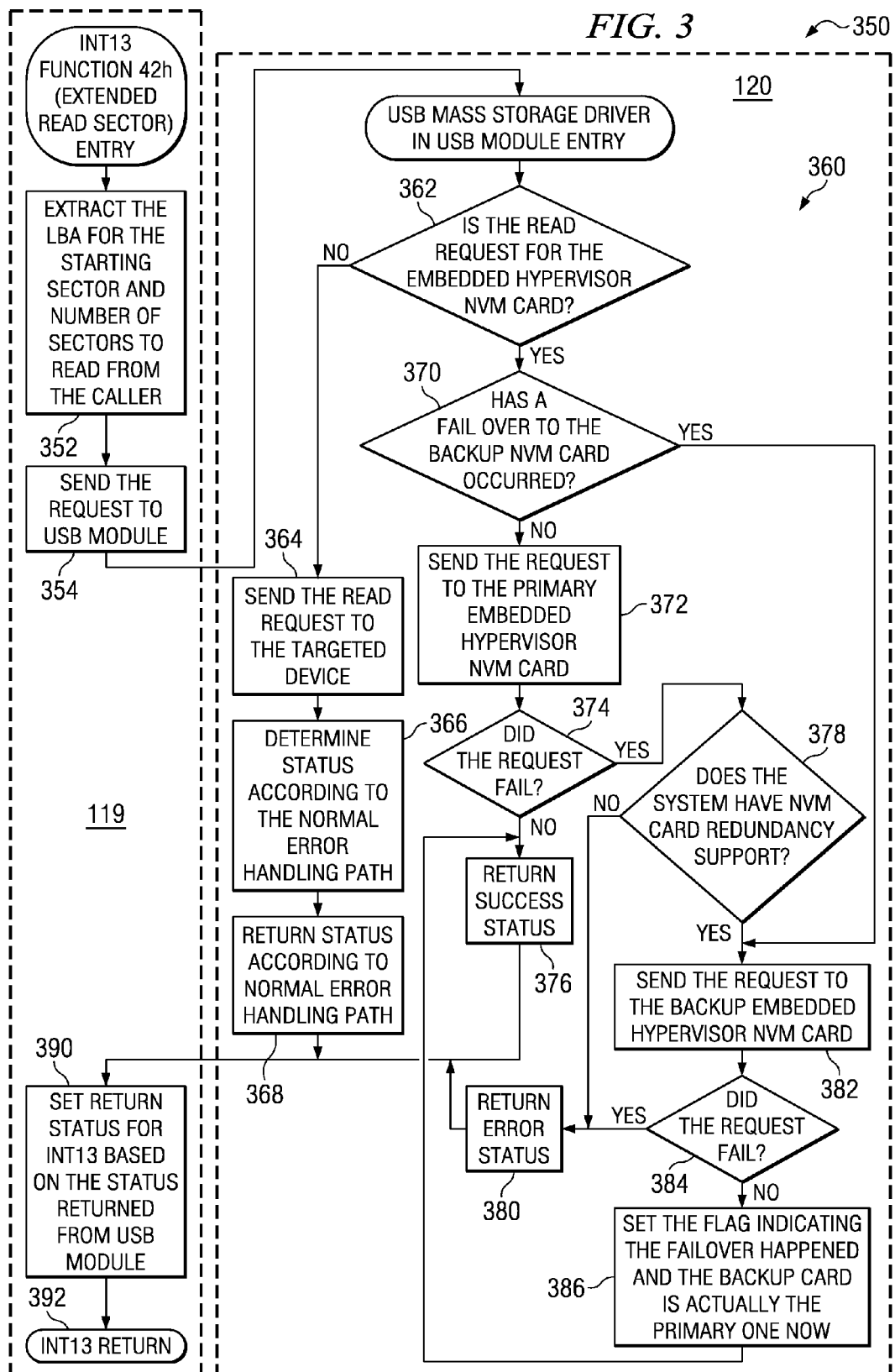

SYSTEMS AND METHODS TO PROVIDE FAILOVER SUPPORT FOR BOOTING EMBEDDED HYPERVISOR FROM AN INTERNAL NON-VOLATILE MEMORY CARD

TECHNICAL FIELD

The present disclosure relates in general to information handling systems with an embedded hypervisor, and more particularly to improving failover support for booting information handling systems with an embedded hypervisor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures by which information handling systems boot their respective operating systems remotely from storage resources. An information handling system may include an embedded hypervisor stored on a secure digital (SD) card operably coupled to an internal universal serial bus (USB). During boot, the hypervisor image is installed on a single SD card without any redundancy. However, in the case of SD card failure or image corruption, a user typically is required to use a recovery CD to reimage a new SD card. Reimaging may adversely impact system uptime and overall user satisfaction.

SUMMARY

Therefore, a need has arisen for systems and methods to provide failover support for booting an embedded hypervisor from an internal non-volatile memory (NVM) card. In accordance with the teachings of the present disclosure, disadvantages and problems associated with information handling systems lacking failover support for booting embedded hypervisor have been substantially reduced or eliminated.

The present disclosure relates, in some embodiments, to methods for installing a mass storage device driver service on an internal non-volatile memory (NVM) card in an information handling system. An information handling system may comprise, for example, a processor, one or more applications configured to be executed, at least in part, by the processor, a memory communicatively coupled to the processor, a primary internal embedded hypervisor NVM card communicatively coupled to the memory, and a back up embedded hypervisor NVM card communicatively coupled to the memory. A method for installing a mass storage device driver service on an internal NVM card may comprise (a) determining during boot whether a device of the information handling system is the primary embedded hypervisor NVM card and, if so, installing mass storage device driver service on the device, (b) determining whether a device of the information handling system determined in (a) to be other than the primary embedded hypervisor NVM card is the back up embedded hypervisor NVM card and, if not, installing mass storage device driver service on the device, (c) in response to a determination in (b) that the device is the back up embedded hypervisor NVM card, determining whether the primary embedded hypervisor NVM card is/was detected during Power On Self Test (POST) and, if not, installing mass storage device driver service for the back up embedded hypervisor NVM card and setting flags indicating no redundancy support, and (d) exiting without installing mass storage device driver service in response to a determination in (c) that the primary embedded hypervisor NVM card is/was detected during POST. According to some embodiments, a mass storage device driver may comprise an interrupt handler interface (e.g., a BIOS INT13 interface), an operating system driver, and/or a unified extensible firmware interface driver. A primary internal embedded hypervisor NVM card and/or a back up internal embedded hypervisor NVM card may be a media selected from the group consisting of read-only memory, FLASH memory, magnetic storage drive, optical drive storage, in some embodiments. For example, at least one of the primary internal embedded hypervisor NVM card and the back up internal embedded hypervisor NVM card may be a secure digital card.

The present disclosure also relates, according to some embodiments, to a method for processing an interrupt request in an information handling system. A method may include, for example, (I) determining whether the interrupt request is for an embedded hypervisor NVM card, and (A) in response to a negative answer in (I), (1) sending the interrupt request to the targeted device, (2) determining status according to the targeted device's error handling path, and (3) returning status according to the targeted device's error handling path; and (B) in response to an affirmative answer in (I), determining whether a failover to back up embedded hypervisor NVM card has occurred, and (1) in response to a negative answer in (I)(B), (a) sending the interrupt request to the primary embedded hypervisor NVM card, and (b) determining whether the interrupt request failed and, (1') in response to a negative answer in (I)(B)(1)(b), returning success status, and (2') in response to an affirmative answer in (I)(B)(1)(b), determining whether the system has NVM card redundancy support, and (a') in response to a negative answer in (I)(B)(1)(b)(2'), returning error status, and (b') in response to an affirmative answer in (I)(B)(1)(b)(2'), proceeding to (I)(B)(2)(a), (2) in response to an affirmative answer in (I)(B), (a) sending the interrupt request to the back up embedded hypervisor NVM card, (b) determining whether the interrupt request failed, and (1') in response to a negative answer in (I)(B)(2)(b), (a') setting a flag indicating that the failover occurred and that back up embedded hypervisor NVM card is functioning as the primary card, and (b') returning success status, and (2') in response to an affirmative answer in (I)(B)(2)(b) step, returning error status. An information handling system may include, according to some embodiments, a processor, one or more applications configured to be executed, at least in part, by the processor, a memory communicatively coupled to the processor and having a USB driver mass storage device driver, a primary internal embedded hypervisor NVM card communicatively coupled to the memory, and a back up embedded hypervisor NVM card communicatively coupled to the memory. According to some embodiments, a mass storage device driver may comprise an interrupt handler interface (e.g., a BIOS INT13 interface), an operating system driver, and/or a unified extensible firmware interface driver. A primary internal embedded hypervisor NVM card and/or a back up internal embedded hypervisor NVM card may be a media selected from the group consisting of read-only memory, FLASH memory, magnetic storage drive, optical drive storage, in some embodiments. For example, at least one of the primary internal embedded hypervisor NVM card and the back up internal embedded hypervisor NVM card may be a secure digital card.

The present disclosure further relates to information handling systems with failover support for booting an embedded hypervisor, the information handling system. For example, an information handling system with failover support may comprise a processor; one or more applications configured to be executed, at least in part, by the processor; a memory communicatively coupled to the processor and comprising a basic input/output system (BIOS), the BIOS comprising a BIOS universal serial bus (USB) driver, the BIOS USB driver comprising a mass storage device driver; a primary internal embedded hypervisor non-volatile memory (NVM) card communicatively coupled to the memory, the first NVM card comprising a first bootable hypervisor image; and a back up internal embedded hypervisor NVM card communicatively coupled to the memory, the second NVM card comprising a second bootable hypervisor image. In some embodiments, an information handling system may be configured to (a) query each device of the information handling system during boot to determine whether the device is the primary internal embedded hypervisor NVM card and, if so, install mass storage device driver service on the device; (b) determine whether each device of the information handling system determined in (a) to be other than the primary internal embedded hypervisor NVM card is the back up internal embedded hypervisor NVM card and, if not, install mass storage device driver service on the device; (c) in response to a determination in (b) that the device is the back up embedded hypervisor NVM card, determine whether the primary internal embedded hypervisor NVM card is/was detected during Power On Self Test (POST) and, if not, (i) install mass storage device driver service for the back up internal embedded hypervisor NVM card and (ii) setting flags indicating no redundancy support; and (d) exit boot without installing mass storage device driver service in response to a determination in (c) that the primary embedded hypervisor NVM card is/was detected during POST. In some embodiments, the first NVM card and the second NVM card are the same size and the same type. The first NVM card and the second NVM card, according to some embodiments, may differ at least in size, type, or size and type. The first bootable hypervisor image and the second bootable hypervisor image are the same in some embodiments. According to some embodiments, a mass storage device driver may comprise an interrupt handler interface (e.g., a BIOS INT13 interface), an operating system driver, and/or a unified extensible firmware interface driver. A primary internal embedded hypervisor NVM card and/or a back up internal embedded hypervisor NVM card may be a media selected from the group consisting of read-only memory, FLASH memory, magnetic storage drive, optical drive storage, in some embodiments. For example, at least one of the primary internal embedded hypervisor NVM card and the back up internal embedded hypervisor NVM card may be a secure digital card.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow chart of an example method for providing failover support for booting an embedded hypervisor from an internal non-volatile memory card, in accordance with the present disclosure.

DETAILED DESCRIPTION

Figure 1:
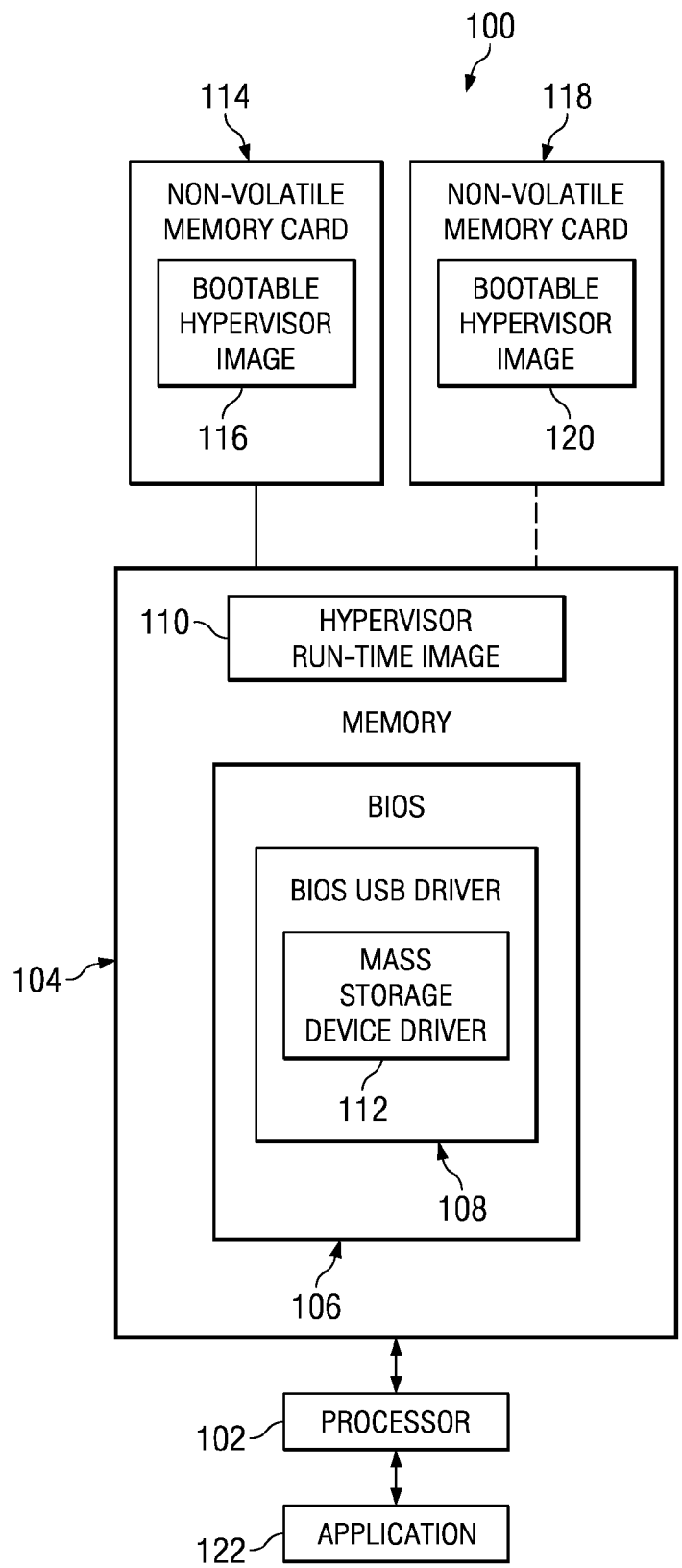
FIG. 1 illustrates a block diagram of an example system for providing failover support for booting an embedded hypervisor from an internal non-volatile memory card, in accordance with the present disclosure.
Figure 2:
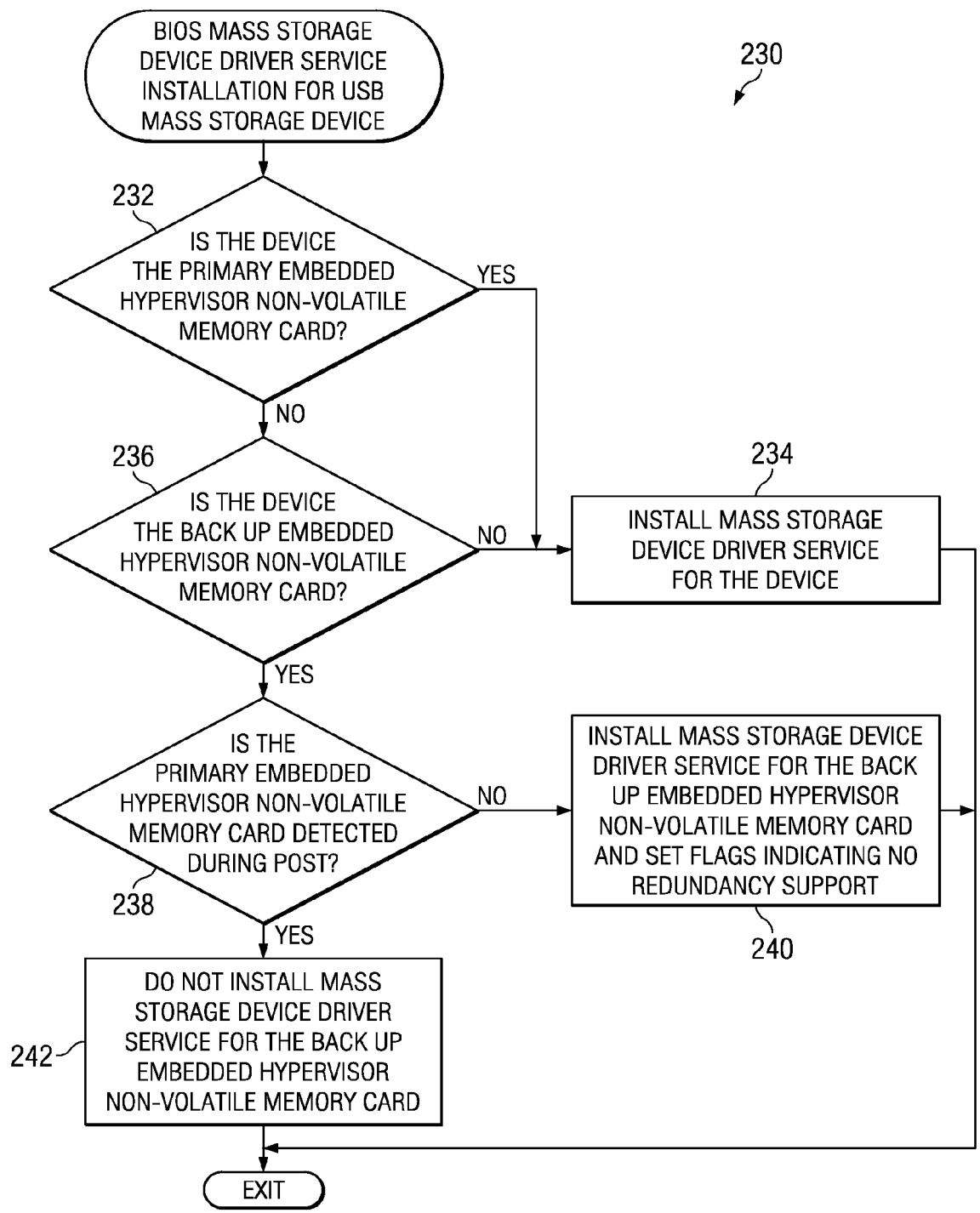
FIG. 2 illustrates a flow chart of an example method for providing failover support for booting an embedded hypervisor from an internal non-volatile memory card, in accordance with the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor described more fully below, may comprise firmware. As used in this disclosure, firmware includes any software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates an example information handling system 100 having a system for providing failover support for booting an embedded hypervisor from an internal non-volatile memory (NVM) card, in accordance with embodiments of the present disclosure. As shown in FIG. 1, information handling system 100 may include a processor 102, memory 104, basic input/output system (BIOS) 106, hypervisor run-time image 110, mass storage device driver 112, NVM card 114, bootable hypervisor image 116, NVM card 118, bootable hypervisor image 120, and application 122.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100 and may output results, graphical user interfaces (GUIs), websites, and the like.

Memory 104 may be coupled to processor 102 and may comprise any system, device, or apparatus operable to retain program instructions or data for a period of time. Memory 104 may be random access memory (RAM), electrically erasable programmable read-only memory (EEPROM), a PCM-CIA card, flash memory, or any suitable selection and/or array of volatile or non-volatile memory that retains data after power to information handling system 100 is turned off. For example, memory 104 may store BIOS 106, generally referred to as a basic input/output system, which may include a firmware configured to identify and/or initiate hardware components (e.g., hard drives, floppy drive, disk drives, keyboards, mouse, and other integrated or peripheral components coupled to information handling system 100).

BIOS 106 may be used to ensure that all components are functional. Particularly, BIOS 106 may be responsible for establishing the association between device components (e.g., disk drives, video controllers, keyboard, mouse, etc.) and the operating system executed by the information handling system. BIOS 106 may also include data and instructions that enable the operating system to access the information handling system hardware. The system BIOS may be stored in the information handling system's memory, typically in non-volatile memory such as flash memory, for example. During booting, the system BIOS may load interrupt handlers and/or device drivers, perform a Power On Self Test (POST), determine which devices are bootable, and/or load the operating system. Following successful loading of the operating system, the user will be able to take advantage of all features and functionality offered by or through the operating system.

BIOS USB driver 108 may be a small piece of software configured to identify hardware components (e.g., USB hardware components) including keyboard, mouse, hard drive, floppy drive, memory, and the like. BIOS USB driver 108 may interface with and/or include mass storage device driver 112. BIOS USB driver 108 may contain code to provide failover functionality for the primary NVM card.

In some embodiments, a hypervisor may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. In some embodiments, a hypervisor may include a native hypervisor and/or a hosted hypervisor. A hypervisor may be one of a variety of proprietary and/or commercially available virtualization platforms, including without limitation, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In some embodiments, a hypervisor may comprise a specially designed operating system (OS) with native virtualization capabilities. A hypervisor may comprise a standard OS with an incorporated virtualization component for performing virtualization according to some embodiments.

Hypervisor run-time image 110 may be a virtualization platform that supports a plurality of operating systems running concurrently on one information handling system. For example, hypervisor run-time image 110 may simulate a plurality of virtual machines, each running its own operating system, wherein at least two different operating systems run concurrently.

Mass storage device driver 112 communicates with NVM cards 114 and/or 118, for example, through a bus or other communications subsystem. Mass storage device driver 112 may include an interrupt handler interface (e.g., a BIOS INT13 interface), an operating system driver, and/or a unified extensible firmware interface (UEFI) driver. For example, mass storage device driver 112 may include an interrupt (INT) handler that serves as a translator between the operating system and hardware components. An INT handler may trigger a hardware and/or software interrupt, where the hardware and/or software pauses (e.g., to perform another function) and later resumes (e.g., upon completing the other function). Examples of interrupt function include, without limitation, INT00 to INTFF (hexidecimal). For example, an interrupt may be selected from the group consisting of INT10, INT13, and INT21.

NVM cards 114 and 118 may be any type of memory that retains stored information in the presence and absence of power. Examples of NVM include, without limitation, read-only memory, FLASH memory (e.g., SD cards), magnetic storage drives, and/or optical drive storage.

NVM card 114 may be configured as a primary NVM card such that it is booted first and/or to the exclusion of NVM card 118. NVM card 118 may be configured as a back up memory card. Back up NVM card 118 may be a physically independent NVM card, which may provide maximum tolerance. Back up card 118 may be a separate LUN or interface from the same physical device. NVM card 118 does not have to be the same size and type as card 114. An information handling system including a back up NVM card that is not of the same size and type as the primary NVM card, may further include boot code that uses logical block addressing (LBA), for example, instead of cylinder head sector (CHS) addressing, to address the media. In some embodiments, LBA addressing may be desirable to avoid compatibility issues that may be associated with CHS addressing. A user (e.g., a customer), in some embodiments, may need to make sure that both NVM cards have the same (e.g., exactly the same) image. This may be guaranteed as part of the image creation process in factor as well as a recovery CD process.

Bootable hypervisor images 116 and 120 may each comprise a hypervisor image that may be loaded into memory 104 during boot. Bootable hypervisor images 116 and 120 may be configured to load a hypervisor run-time image into memory 104.

Application 122 may be any type of application executable by processor 102. For example, application 122 may comprise a web server, an email server, a database, an anti-virus application.

In operation, BIOS 106 may be responsible for loading hypervisor run-time image 110 during boot in some embodiments. For example, BIOS USB driver 108 may enumerate NVM card 114 (e.g., an SD card) and install interrupt (e.g., INT13) services for it. Mass storage device driver 112 may interface BIOS USB driver 108 and communicate to NVM card 114 itself. Before system boot, if NVM card 114 is selected to boot first, BIOS 106 will give control to the boot sector (e.g., master boot record (MBR)) of NVM card 114 and the boot sector will issue interrupt (e.g., INT13) calls to load the rest of the image.

According to some embodiments, once hypervisor run-time image 110 is loaded in memory 104, it will not access NVM card 114 media any more (except in very rare cases). So, redundancy may be desired for boot time only.

During a BIOS USB enumeration process, according to some embodiments, both primary NVM card 114 and back up NVM card 118 may be enumerated normally. For example, both cards may be properly reset and assigned unique addresses on the USB. In some embodiments, however, BIOS only installs interrupt (e.g., INT13) service for the primary NVM card (e.g., card 114). In some embodiments, interrupt (e.g., INT13) installation may be performed in accordance with the flow chart shown in FIG. 2.

According to some embodiments, methods and systems of the disclosure may furnish a seamless failover support. For example, if a BIOS interrupt (e.g., INT13) targeted for the primary NVM card failed, BIOS may set certain types of flags to indicate the failure. In a subsequent retry of the same interrupt (e.g., INT13) function as well as in future interrupt (e.g., INT13) calls, BIOS USB driver will re-direct the request/command that is targeted to the primary NVM card to the back up non-volatile memory card. This re-direct may be performed within (e.g., entirely within) a USB driver layer, transparent to the interrupt (e.g., INT13) interface and boot code. An example embodiment of a method of providing failover support inside INT13 is illustrated by FIG. 3.

A failover may be bi-directional according to some embodiments. For example, if a back up NVM card returns a READ failure on certain sectors, BIOS can switch back to the primary card again. This may increase (e.g., maximize) redundancy support—a method or system may fail to result in a successful boot only if the same sector location is corrupted on both NVM cards.

BIOS 106 may also log a system event log (SEL) event to a baseboard management controller (BMC) to indicate a failover event so that a user may take actions to replace the faulty NVM card(s) in some embodiments. BIOS may flag in NVM (e.g., CMOS or NVRAM) so that the next boot swaps the primary and back up card based on the flag. In some embodiments, it may be desired to configure a re-direct upon failure as a switchover (e.g., rather than a failover).

FIG. 2 illustrates a flow chart of an example method 230 for providing failover support for booting an embedded hypervisor from an internal NVM card, in accordance with embodiments of the present disclosure. In some embodiments, method 230 comprises (a) determining 232 whether a device is the primary embedded hypervisor NVM card 114 and, if so, installing 234 mass storage device driver service on the device; (b) determining 236 whether a device determined in (a) to be other than the primary embedded hypervisor NVM card 114 is the back up embedded hypervisor NVM card 118 and, if not, installing 234 mass storage device driver service on the device; (c) in response to a determination in (b) that the device is the back up embedded hypervisor NVM card 118, determining 238 whether the primary embedded hypervisor NVM card 114 is/was detected during POST and, if not, installing 240 mass storage device driver service for the back up embedded hypervisor NVM card 118 and setting flags indicating no redundancy support; and (d) exiting 242 without installing mass storage device driver service in response to a determination in (c) that the primary embedded hypervisor NVM card 114 is/was detected during POST. Method 230 may be performed during BIOS enumeration such that each device (e.g., each internal NVM card) is evaluated in turn.

According to one embodiment, method 230 preferably begins at step 232. As noted above, teachings of the present disclosure may be implemented in a variety of configurations of system 100. As such, the preferred initialization point for method 230 and the order of the steps 232-242 comprising method 230 may depend on the implementation chosen.

At step 232, BIOS USB driver 108 queries a device to determine whether it is primary embedded hypervisor NVM card 114. If it is, BIOS USB driver 108 installs 234 mass storage device driver services and exits. In response to a negative response at step 232, BIOS USB driver 108 queries 236 the device to determine whether it is the back up embedded hypervisor NVM card 118. If it is not (i.e., it is neither the hypervisor primary card 114 nor back up card 118, but some other mass storage device), BIOS USB driver 108 installs 234 mass storage device driver services and exits. On the other hand, in response to an affirmative answer at step 236, BIOS USB driver 108 determines 238 whether the primary embedded hypervisor NVM card 114 was detected during POST. If not BIOS USB driver 108 installs 240 mass storage device driver services, sets 240 one or more flags indicating no redundancy exists, and exits. In response to an affirmative answer at step 238, BIOS USB driver 108 exits boot (e.g., immediately or upon completion of one or more other tasks) without installing mass storage device driver services because those services were already installed or will be installed on primary embedded hypervisor NVM card 114.

Although FIG. 2 discloses a particular number of steps to be taken with respect to method 230, method 230 may be executed with greater or lesser steps than those depicted in FIG. 2. In addition, although FIG. 2 discloses a certain order of steps to be taken with respect to method 230, the steps comprising method 230 may be completed in any suitable order.

Method 230 may be implemented using system 100 or any other system operable to implement method 230. In certain embodiments, method 230 may be implemented partially or fully in software embodied in computer-readable media.

FIG. 3 illustrates a flow chart of an example method 350 for providing failover support for booting an embedded hypervisor from an internal NVM card, in accordance with embodiments of the present disclosure. The flow chart is presented in the context of a non-limiting example, in which INT13 module 119 calls a USB module 120 (e.g., a USB mass storage driver therein). In some embodiments, method 350 comprises, upon receiving an interrupt function call (e.g., INT13 function 42h extended read sector), extracting 352 the LBA for the starting sector and number of sectors to read from the caller, sending 354 the request to a USB module, processing 360 the request in the USB module, setting 390 the return status for the call based on the status returned from the USB module, and returning 392 control. Processing 360 the request in the USB module may comprise, according to some embodiments, (I) determining 362 whether the READ request is for an embedded hypervisor NVM card, and
  (A) in response to a negative answer in (I) step 362,
    (1) sending 364 the READ request to the targeted device,
    (2) determining 366 status according to the targeted device's error handling path, and
    (3) returning 368 status according to the targeted device's error handling path; and
  (B) in response to an affirmative answer in (I) step 362, determining 370 whether a failover to back up embedded hypervisor NVM card 118 has occurred, and
    (1) in response to a negative answer in (I)(B) step 370,
      (a) sending 372 the READ request to the primary embedded hypervisor NVM card 114, and
      (b) determining 374 whether the READ request failed and,
        (1') in response to a negative answer in (I)(B)(1)(b) step 374, returning 376 success status, and
        (2') in response to an affirmative answer in (I)(B)(1)(b) step 374, determining 378 whether the system has NVM card redundancy support, and
          (a') in response to a negative answer in (I)(B)(1)(b)(2') step 378, returning 380 error status, and
          (b') in response to an affirmative answer in (I)(B)(1)(b)(2') step 378, proceeding to (I)(B)(2)(a) step 382,
    (2) in response to an affirmative answer in (I)(B) step 370,
      (a) sending 382 the READ request to the back up embedded hypervisor NVM card 114,
      (b) determining 384 whether the READ request failed, and
        (1') in response to a negative answer in (I)(B)(2)(b) step 384,
          (a') setting 386 a flag indicating that the failover occurred and that back up embedded hypervisor NVM card 118 is functioning as the primary card, and
          (b') returning 376 success status, and
        (2') in response to an affirmative answer in (I)(B)(2)(b) step 384, returning 380 error status.

According to one embodiment, method 350 preferably begins at step 352. As noted above, teachings of the present disclosure may be implemented in a variety of configurations of system 100. As such, the preferred initialization point for method 350 and the order of the steps 352-392 comprising method 350 may depend on the implementation chosen.

At step 352, BIOS USB driver 108 extracts the LBA for the starting sector and number of sectors to read from the caller for a READ request received from an INT13 function 42h. At step 354, BIOS USB driver 108 sends the READ request to the USB module where it is processed.

At step 360, BIOS USB driver 108 processes the READ request. Processing 360 the READ request may be transparent to the INT13 interface and boot code.

At step 362, BIOS USB driver 108 determines whether the READ request is for the embedded hypervisor NVM card. A negative answer may be returned where, for example, the command's file descriptor points to a device other than an embedded hypervisor NVM card. An affirmative answer may be returned where, for example, the command's file descriptor points to an embedded hypervisor NVM card (e.g., embedded hypervisor NVM card 114).

At step 364, BIOS USB driver 108 sends the READ request to the targeted device (i.e., other than an embedded hypervisor NVM card).

At step 366, the target device processes the READ request and determines the request status (e.g., success or error) in accordance with its error handling system.

At step 368, BIOS USB driver 108 returns the request status determined at step 366.

At step 370, BIOS USB driver 108 determines whether a failover to a back up embedded hypervisor NVM card. A negative answer may be returned for system 100 where there are no flags indicating that a failover has occurred. An affirmative answer may be returned for system 100 where there are one or more flags indicating that a failover has occurred.

At step 372, BIOS USB driver 108 sends the READ request to the primary embedded hypervisor NVM card 114 for execution.

At step 374, BIOS USB driver 108 determines whether the READ request failed. A negative answer may be returned if the READ request executed without generating errors. A positive answer may be returned where the READ request executed with one or more errors and/or failed to execute.

At step 376, BIOS USB driver 108 returns success status indicating that the READ request executed without errors.

At step 378, BIOS USB driver 108 determines whether the system has embedded hypervisor NVM card support. For example, system 100 in its normal operating state would generate an affirmative response since it includes embedded hypervisor NVM card 114 and embedded hypervisor NVM card 118 and additional BIOS USB driver code that provides failover functionality. System 100 would generate a negative answer where, even though both embedded hypervisor NVM card 114 and embedded hypervisor NVM card 118 are present, one of them has failed (e.g., due to corruption).

At step 380, BIOS USB driver 108 returns error status indicating that the READ request executed with one or more errors and/or failed to execute.

At step 382, BIOS USB driver 108 sends the READ request to back up embedded hypervisor 118.

At step 384, BIOS USB driver 108 determines whether the READ request failed. A negative answer may be returned if the READ request executed without generating errors. A positive answer may be returned where the READ request executed with one or more errors and/or failed to execute.

At step 386, BIOS USB driver 108 sets one or more flags indicating that a failover has occurred and/or that embedded hypervisor NVM card 118 is performing the role of the primary card.

At step 390, BIOS USB driver 108 sets the return status for INT13 based on the status returned from the USB module (e.g., steps 376 and 380). At step 392, BIOS USB driver 108 returns control (e.g., to BIOS).

Although FIG. 3 discloses a particular number of steps to be taken with respect to method 350, method 350 may be executed with greater or lesser steps than those depicted in FIG. 3. In addition, although FIG. 2 discloses a certain order of steps to be taken with respect to method 350, the steps comprising method 350 may be completed in any suitable order.

Method 350 may be implemented using system 100 or any other system operable to implement method 350. In certain embodiments, method 350 may be implemented partially or fully in software embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A method for installing a mass storage device driver service on an internal non-volatile memory (NVM) card in an information handling system including a processor, one or more applications configured to be executed, at least in part, by the processor, a memory communicatively coupled to the processor, a primary internal embedded hypervisor NVM card communicatively coupled to the memory, and a back up embedded hypervisor NVM card communicatively coupled to the memory, the method comprising:
    (a) determining during boot whether a device of the information handling system is the primary embedded hypervisor NVM card and, if so, installing mass storage device driver service on the device;
    (b) determining whether a device of the information handling system determined in (a) to be other than the primary embedded hypervisor NVM card is the back up embedded hypervisor NVM card and, if not, installing mass storage device driver service on the device;
    (c) in response to a determination in (b) that the device is the back up embedded hypervisor NVM card, determining whether the primary embedded hypervisor NVM card is/was detected during Power On Self Test (POST) and, if not, installing mass storage device driver service for the back up embedded hypervisor NVM card and setting flags indicating no redundancy support; and
    (d) exiting without installing mass storage device driver service in response to a determination in (c) that the primary embedded hypervisor NVM card is/was detected during POST.

2. A method according to claim 1, wherein the mass storage device driver comprises a BIOS INT13 interface.

3. A method according to claim 1, wherein the mass storage device driver comprises an operating system driver.

4. A method according to claim 1, wherein the mass storage device driver comprises a unified extensible firmware interface driver.

5. A method according to claim 1, wherein at least one of the primary internal embedded hypervisor NVM card and the back up internal embedded hypervisor NVM card is a media selected from the group consisting of read-only memory, FLASH memory, magnetic storage drive, optical drive storage.

6. A method according to claim 1, wherein at least one of the primary internal embedded hypervisor NVM card and the back up internal embedded hypervisor NVM card is a secure digital card.

7. A method for processing an interrupt request in an information handling system including a processor, one or more applications configured to be executed, at least in part, by the processor, a memory communicatively coupled to the processor and having a USB driver mass storage device driver, a primary internal embedded hypervisor NVM card communicatively coupled to the memory, and a back up embedded hypervisor NVM card communicatively coupled to the memory, the method comprising:
    (I) determining whether the interrupt request is for an embedded hypervisor NVM card, and
        (A) in response to a negative answer in (I),
            (1) sending the interrupt request to the targeted device,
            (2) determining status according to the targeted device's error handling path, and
            (3) returning status according to the targeted device's error handling path; and
        (B) in response to an affirmative answer in (I), determining whether a failover to back up embedded hypervisor NVM card has occurred, and
            (1) in response to a negative answer in (I)(B),
                (a) sending the interrupt request to the primary embedded hypervisor NVM card, and
                (b) determining whether the interrupt request failed and,
                    (1') in response to a negative answer in (I)(B)(1)(b), returning success status, and
                    (2') in response to an affirmative answer in (I)(B)(1)(b), determining whether the system has NVM card redundancy support, and
                        (a') in response to a negative answer in (I)(B)(1)(b)(2'), returning error status, and
                        (b') in response to an affirmative answer in (I)(B)(1)(b)(2'), proceeding to (I)(B)(2)(a),
            (2) in response to an affirmative answer in (I)(B),
                (a) sending the request to the back up embedded hypervisor NVM card,
                (b) determining whether the request failed, and
                    (1') in response to a negative answer in (I)(B)(2)(b),
                        (a') setting a flag indicating that the failover occurred and that back up embedded hypervisor NVM card is functioning as the primary card, and
                        (b') returning success status, and
                    (2') in response to an affirmative answer in (I)(B)(2)(b) step, returning error status.

8. A method according to claim 7, wherein the mass storage device driver comprises a BIOS INT13 interface.

9. A method according to claim 7, wherein the mass storage device driver comprises an operating system driver.

10. A method according to claim 7, wherein the mass storage device driver comprises a unified extensible firmware interface driver.

11. A method according to claim 7, wherein at least one of the primary internal embedded hypervisor NVM card and the back up internal embedded hypervisor NVM card is a media selected from the group consisting of read-only memory, FLASH memory, magnetic storage drive, optical drive storage.

12. A method according to claim 7, wherein at least one of the primary internal embedded hypervisor NVM card and the back up internal embedded hypervisor NVM card is a secure digital card.

13. An information handling system with failover support for booting an embedded hypervisor, the information handling system comprising:
  a processor;
  one or more applications configured to be executed, at least in part, by the processor;
  a memory communicatively coupled to the processor and comprising a basic input/output system (BIOS), the BIOS comprising a BIOS universal serial bus (USB) driver, the BIOS USB driver comprising a mass storage device driver;
  a primary internal embedded hypervisor non-volatile memory (NVM) card communicatively coupled to the memory, the first NVM card comprising a first bootable hypervisor image; and
  a back up internal embedded hypervisor NVM card communicatively coupled to the memory, the second NVM card comprising a second bootable hypervisor image,
  the information handling system configured to:
  (a) query each device of the information handling system during boot to determine whether the device is the primary internal embedded hypervisor NVM card and, if so, install mass storage device driver service on the device;
  (b) determine whether each device of the information handling system determined in (a) to be other than the primary internal embedded hypervisor NVM card is the back up internal embedded hypervisor NVM card and, if not, install mass storage device driver service on the device;
  (c) in response to a determination in (b) that the device is the back up embedded hypervisor NVM card, determine whether the primary internal embedded hypervisor NVM card is/was detected during Power On Self Test (POST) and, if not,
    (i) install mass storage device driver service for the back up internal embedded hypervisor NVM card and
    (ii) setting flags indicating no redundancy support; and
  (d) exit boot without installing mass storage device driver service in response to a determination in (c) that the primary embedded hypervisor NVM card is/was detected during POST.

14. An information handling system according to claim 13, wherein the first NVM card and the second NVM card are the same size and the same type.

15. An information handling system according to claim 13, wherein the first NVM card and the second NVM card differ at least in size, type, or size and type.

16. An information handling system according to claim 13, wherein the first bootable hypervisor image and the second bootable hypervisor image are the same.

17. An information handling system according to claim 13, wherein the mass storage device driver comprises an interrupt handler.

18. An information handling system according to claim 13, wherein the mass storage device driver comprises a driver selected from the group consisting of an operating system loader, a unified extensible firmware interface, and combinations thereof.

19. An information handling system according to claim 13, wherein at least one of the primary internal embedded hypervisor NVM card and the back up internal embedded hypervisor NVM card is a media selected from the group consisting of read-only memory, FLASH memory, magnetic storage drive, optical drive storage.

20. An information handling system according to claim 13, wherein at least one of the primary internal embedded hypervisor NVM card and the back up internal embedded hypervisor NVM card is a secure digital card.

* * * * *